(12) United States Patent
Widmer et al.

(10) Patent No.: US 10,081,250 B2
(45) Date of Patent: Sep. 25, 2018

(54) COOLING FAN VANE ASSEMBLY FOR A RESISTOR GRID

(71) Applicants: Justin P. Widmer, Battle Ground, IN (US); Gabriel E. Widmer, West Lafayette, IN (US)

(72) Inventors: Justin P. Widmer, Battle Ground, IN (US); Gabriel E. Widmer, West Lafayette, IN (US)

(73) Assignee: DAYTON-PHOENIX GROUP, INC., Dayton, OH (US)

( * ) Notice: Subject to any disclaimer, the term of this patent is extended or adjusted under 35 U.S.C. 154(b) by 648 days.

(21) Appl. No.: 14/569,919

(22) Filed: Dec. 15, 2014

(65) Prior Publication Data

US 2016/0167525 A1 Jun. 16, 2016

(51) Int. Cl.
| | |
|---|---|
| *B60L 7/02* | (2006.01) |
| *F04D 29/54* | (2006.01) |
| *F04D 29/32* | (2006.01) |
| *F04D 19/00* | (2006.01) |
| *F04D 25/08* | (2006.01) |
| *B60L 1/02* | (2006.01) |

(52) U.S. Cl.
CPC .............. *B60L 7/02* (2013.01); *F04D 29/542* (2013.01); *F04D 29/545* (2013.01); *F04D 29/547* (2013.01); *B60L 1/02* (2013.01)

(58) Field of Classification Search
CPC .... F04D 29/164; F04D 29/325; F04D 29/526; F04D 29/541; F04D 29/542; F04D 29/547; F04D 29/582; F04D 29/664; F04D 25/02; F04D 25/08; F04D 2250/121; F04D 19/002; F04D 29/545; F01P 5/06; F16C 17/10; B60L 7/02; B60L 7/22; H01C 3/02; H01C 13/02; A45D 20/124; F24F 13/15

USPC .................................... 188/264 R, 3 R, 71.6
See application file for complete search history.

(56) References Cited

U.S. PATENT DOCUMENTS

| | | | |
|---|---|---|---|
| 4,051,452 | A | 9/1977 | Luy |
| 4,359,710 | A | 11/1982 | Luy |
| 5,159,310 | A | 10/1992 | Cummins et al. |
| 5,304,978 | A | 4/1994 | Cummins et al. |
| 6,309,178 | B1 | 10/2001 | Kim et al. |
| 6,749,043 | B2 | 6/2004 | Brown et al. |
| 7,721,855 | B2 | 5/2010 | Marsh et al. |

(Continued)

FOREIGN PATENT DOCUMENTS

| | | |
|---|---|---|
| EP | 2308735 | 10/2009 |
| WO | 2013/038222 | 3/2013 |

OTHER PUBLICATIONS

PCT, International Search Report and Written Opinion; Patent Application No. PCT/US2015/064233 (dated Feb. 11, 2016).

*Primary Examiner* — Robert A. Siconolfi
*Assistant Examiner* — San Aung
(74) *Attorney, Agent, or Firm* — Thompson Hine LLP

(57) ABSTRACT

A cooling fan vane assembly for a resistor grid may include a duct having a substantially round inlet opening, a substantially rectangular outlet opening, and a side wall extending between the inlet opening and the outlet opening shaped to transition from a substantially round shape to a substantially rectangular shape; the inlet opening including a plurality of radially extending turning vanes; and a frustoconical vane positioned in the duct adjacent a downstream side of the plurality of radially extending vanes.

18 Claims, 3 Drawing Sheets

(56) References Cited

U.S. PATENT DOCUMENTS

| | | |
|---|---|---|
| 8,136,643 B2 | 3/2012 | Marsh et al. |
| 8,475,111 B2 | 7/2013 | Stagg et al. |
| 8,587,165 B2 | 11/2013 | Zahora et al. |
| 2002/0003381 A1* | 1/2002 | Nelson .................... F01P 7/048 310/67 R |
| 2003/0007867 A1* | 1/2003 | Chang .................. H01L 23/467 415/220 |
| 2003/0075396 A1* | 4/2003 | Brown .................. F04D 29/541 188/71.6 |
| 2010/0154688 A1* | 6/2010 | Adam ...................... F23D 1/00 110/261 |
| 2010/0154689 A1* | 6/2010 | Adam .................... F16L 57/06 110/265 |
| 2011/0217164 A1* | 9/2011 | Cote .................... F04D 29/526 415/223 |
| 2013/0285583 A1* | 10/2013 | Strothmann ........... B60K 11/06 318/380 |
| 2014/0086728 A1* | 3/2014 | Engert ................. F04D 29/547 415/119 |
| 2014/0119892 A1* | 5/2014 | Mornan ............... F04D 29/542 415/122.1 |

* cited by examiner

COOLING FAN VANE ASSEMBLY FOR A RESISTOR GRID

TECHNICAL FIELD

This disclosure relates to devices and methods for cooling resistive elements that dissipate heat energy and, more particularly, to systems and methods for cooling dynamic braking grids of a type used with electric fraction motors.

BACKGROUND

Large vehicles, such as diesel-electric locomotives and diesel-electric off-highway trucks, such as mining trucks, may be powered by electric traction motors. Electric traction motors for such vehicles may use an alternating current (AC) electric motor powered by either an alternating current alternator-rectifier or a direct current (DC) generator that in turn is powered by a diesel engine. Vehicles powered by such diesel-electric traction motors commonly use dynamic or rheostatic braking systems. In a dynamic braking system, the armature of each traction motor is connected across a forced-air-cooled resistance grid, known as a dynamic braking grid. In a diesel-electric locomotive, the dynamic braking grid typically is located behind the cab.

To brake a diesel-electric engine with a dynamic braking system, the electric traction motor is connected to function as an electric power generator that is driven by the rotating wheels of the moving vehicle. The electricity generated by the traction motor is conducted to the braking grid, which is a frame containing a resistance element in the form of thin metal plates connected in series. The metal plates are made of a material that is electrically conductive, but provides resistance to the current received from the traction motor so that the current is converted to heat that is radiated from the resistor elements. Diesel-electric engines usually employ multiple braking grids. Thus, the energy of motion of the locomotive engine, or other vehicle in which this configuration is installed, is converted to heat in the dynamic braking operation mode that is dissipated from the resistance element plates.

An issue that arises when dynamic braking systems are employed to brake a vehicle, such as a locomotive, traveling at high speed, or when the dynamic braking system is applied to a vehicle traveling downwardly on a relatively steep grade, is that the dynamic braking grid may overheat. Cooling fans typically are employed to direct ambient cooling air across the resistance elements of a dynamic braking grid to maintain the temperature of the resistance elements below a temperature at which damage to the resistance elements or other components of the braking system might occur.

The frame containing the plate-shaped resistance elements of dynamic braking grids typically is rectangular in shape, whereas the cooling fan utilizes a circular turbine to move air over the resistance elements. The circular turbine typically has a central circular hub and a plurality of radially extending fan blades. It is necessary to direct the air flow from the circular cooling fan evenly across the rectangular braking grid. If the air flow from the cooling fan flows unevenly over the resistance elements, hot spots that might occur on the resistor elements in areas with relatively low air flow. Cooling fans typically utilize a duct that encloses stationary vanes to direct air from the turbine of the cooling fan across the rectangular braking grid. Accordingly, there is a need for a cooling fan vane assembly for a resistor grid that effectively and efficiently distributes cooling air evenly across a resistor grid to dissipate heat generated by rheostatic braking.

SUMMARY

In one embodiment, the disclosed cooling fan vane assembly for a resistor grid may include a duct having a substantially round inlet opening, a substantially rectangular outlet opening, and a side wall extending between the inlet opening and the outlet opening shaped to transition from a substantially round shape to a substantially rectangular shape; the inlet opening including a plurality of radially extending vanes; and a frustoconical vane positioned in the duct adjacent a downstream side of the plurality of radially extending vanes.

In another embodiment, a vehicle may include a duct having a substantially round inlet opening, a substantially rectangular outlet opening, and a side wall extending between the inlet opening and the outlet opening shaped to transition from a substantially round shape to a substantially rectangular shape; the inlet opening includes a plurality of radially extending vanes; and a frustoconical vane positioned in the duct adjacent a downstream side of the plurality of radially extending vanes.

In yet another embodiment, a method of cooling a dynamic braking grid may include providing a fan having a hub supporting a plurality of fan blades; positioning a duct adjacent the fan, the duct having a substantially round inlet opening corresponding in diameter to an outer diameter of the plurality of fan blades, a substantially rectangular outlet opening adjacent the dynamic braking grid, and a side wall extending between the inlet opening and the outlet opening shaped to transition from a substantially round shape to a substantially rectangular shape corresponding to a shape of a dynamic braking grid to guide cooling air blown by the fan to the dynamic braking grid; providing an inlet opening including a plurality of radially extending vanes shaped and angled to direct the cooling air in a substantially axial direction relative to the fan hub; and providing a frustoconical vane positioned in the duct adjacent a downstream side of the plurality of radially extending vanes and shaped to distribute cooling air evenly across the dynamic braking grid.

Other objects and advantages of the disclosed cooling fan vane assembly for a resistor grid will be apparent from the following description, the accompanying drawings, and the appended claims.

DETAILED DESCRIPTION

Figure 1:
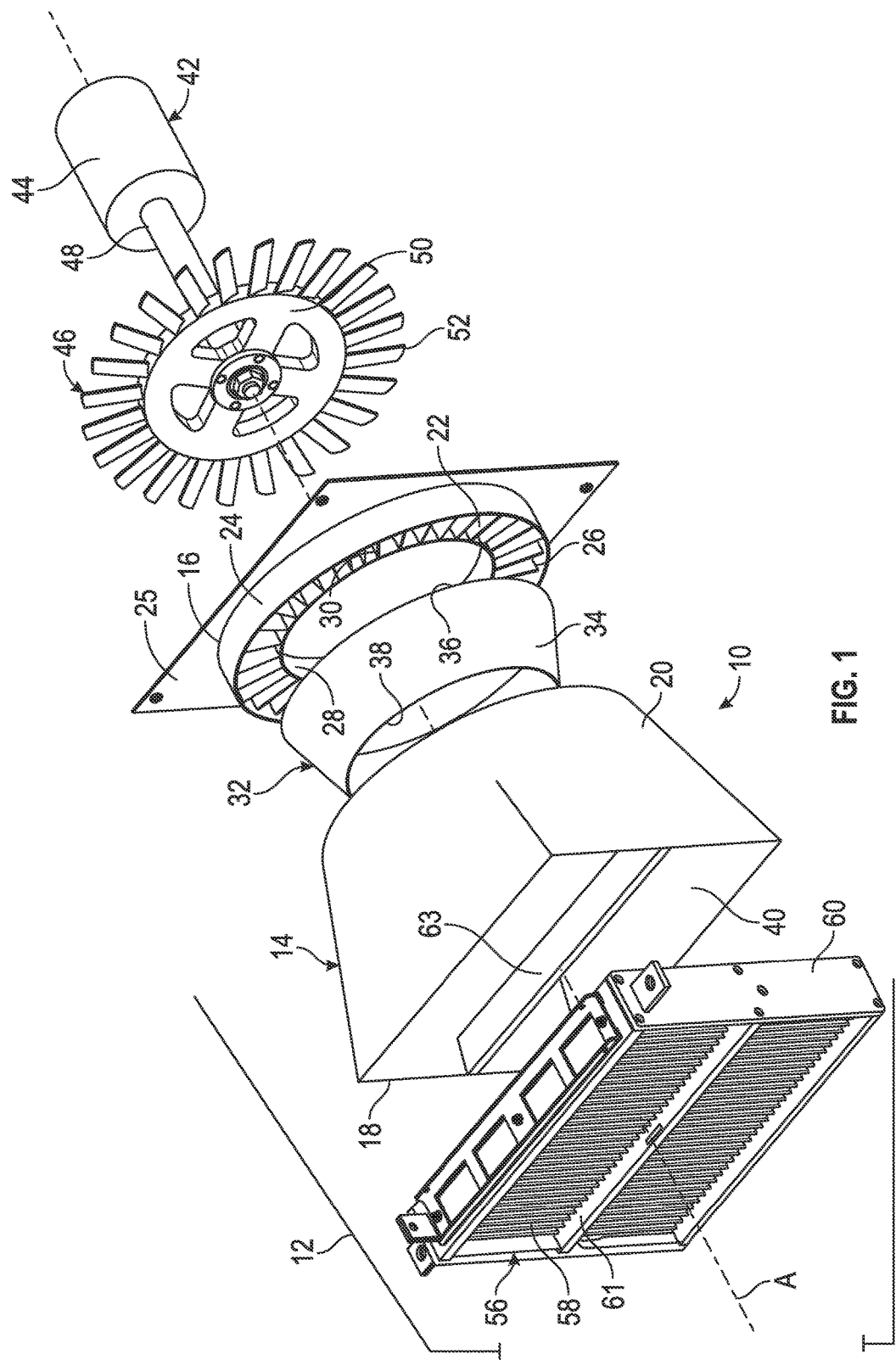
FIG. 1 is an exploded, perspective view of the disclosed cooling fan vane assembly for a resistor grid.
Figure 2:
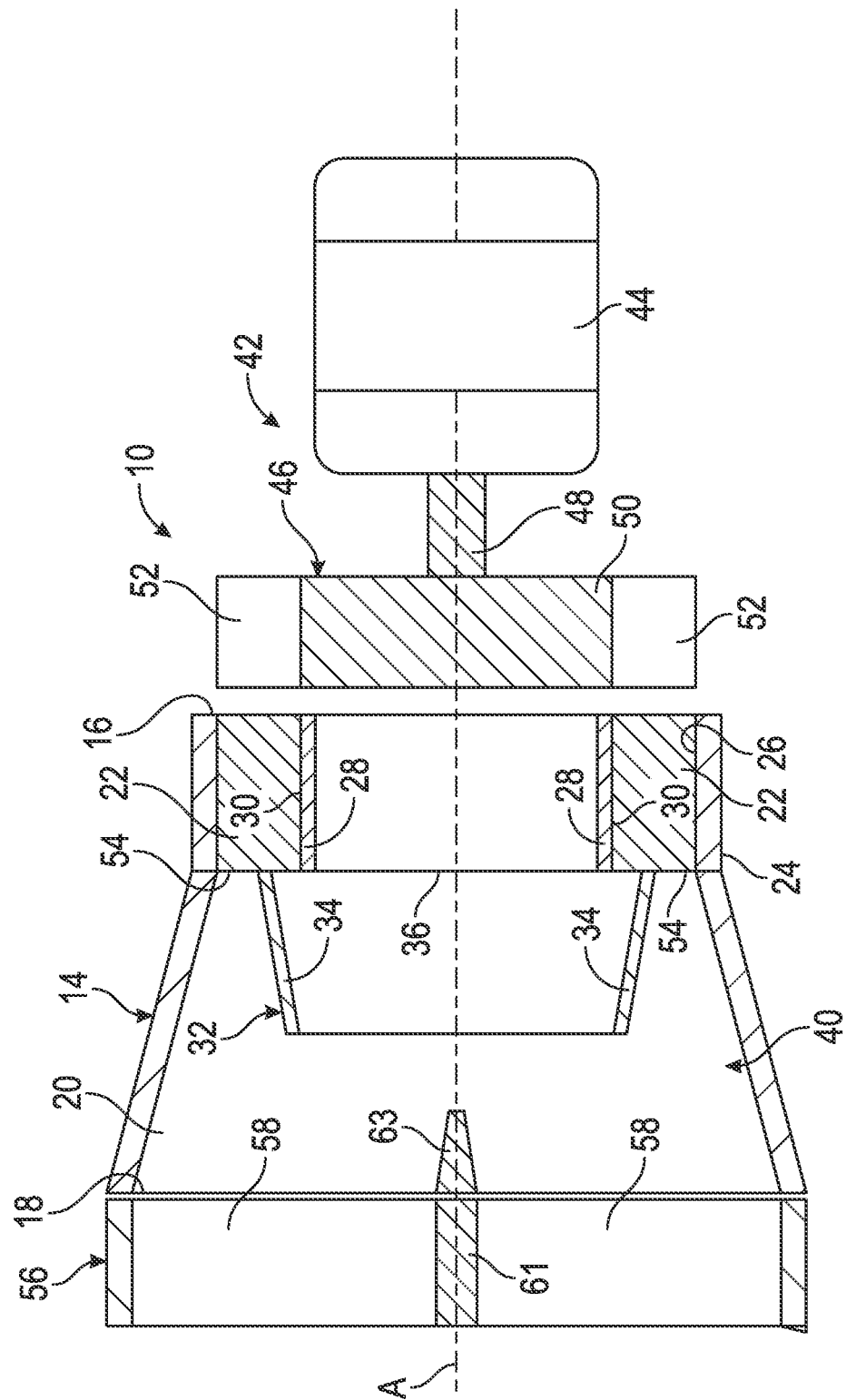
FIG. 2 is a side elevation in section of the cooling fan vane assembly for a resistor grid disclosed in FIG. 1.

As shown in FIGS. 1 and 2, the disclosed cooling fan vane assembly for a resistor grid, generally designated 10, may be configured to be mounted in a vehicle 12, such as a diesel-electric vehicle. Diesel-electric vehicles may include a diesel-electric locomotive traction engine and a diesel-electric truck, such as an off-highway truck, and more particularly a diesel-electric off-highway mining truck. The cooling fan vane assembly 10 may include a duct 14 having a round or substantially round inlet opening 16, a rectangular or substantially rectangular outlet opening 18, and a side wall 20. The side wall 20 may be continuous and imperforate, may extend between the inlet opening 16 and the outlet opening 18, and in embodiments may be shaped to transition from a round or substantially round shape adjacent the inlet opening to a rectangular or substantially rectangular shape adjacent the outlet opening. The rectangular or substantially rectangular shape may take the form of a square or substantially square shape.

The inlet opening 16 may include a plurality of radially extending, or substantially radially extending, vanes 22. The vanes 22 may be spaced about the inner periphery of the inlet opening 16, and in embodiments may be spaced evenly about the inner periphery of the inlet opening. The vanes 22 in embodiments may be plate shaped, and may be angled relative to a centerline A of the vane assembly 10, which coincides with the direction of air flow through the vane assembly.

In an embodiment, the inlet opening 16 may include a substantially cylindrical wall segment 24 that may be attached to a substantially flat mounting plate 25. The mounting plate may be used to attach the vane assembly 10 to a bulkhead (not shown) of the vehicle 12. The radially outer ends 26 of each of the plurality of radially extending vanes 22 may be attached to the radially inner surface of the cylindrical wall segment 24 by one or more of welding, brazing, adhesives, mechanical fasteners such as rivets and nut and bolt combinations, or other well-known means. The inlet opening 16 also may include an inner stiffening ring 28 that may be attached to one or more, and preferably all, of the radially inner ends 30 of the radially extending vanes 22. The inner stiffening ring 28 may be attached to the vanes 20 by one or more of welding, brazing, adhesives, mechanical fasteners such as rivets and nut and bolt combinations, or other well-known means.

Figure 3:
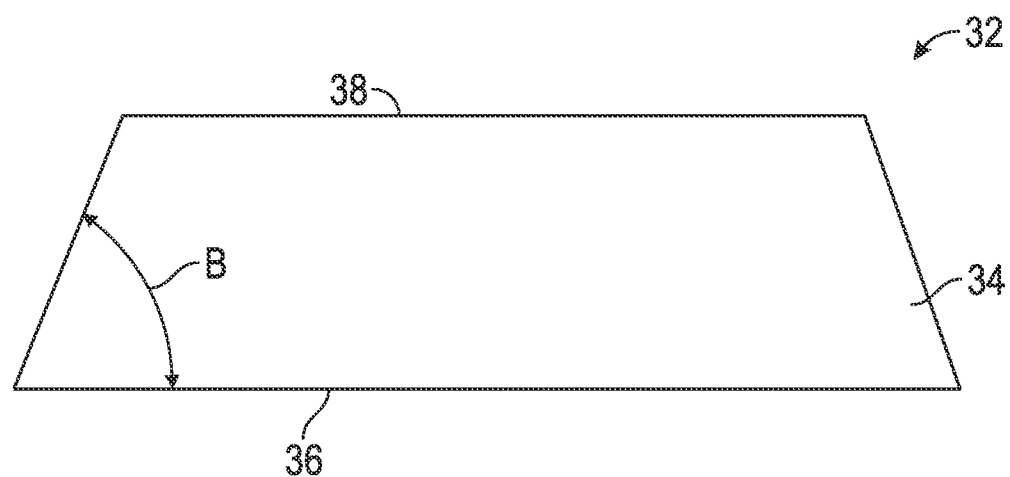
FIG. 3 is a side elevation of the frustoconical vane of the cooling fan vane assembly for a resistor grid of FIG. 1.

The cooling fan vane assembly 10 also may include a frustoconical vane 32. The frustoconical vane 32 may be positioned in the duct 14 adjacent a downstream (i.e., in the direction of air flow along centerline A) side of the plurality of radially extending vanes 22. In an embodiment, the frustoconical vane 32 may include a continuous, imperforate, substantially annular side wall 34 that tapers in diameter from an upstream end 36 to a downstream end 38. In an embodiment, the side wall 34 may form an angle B (see FIG. 3) of approximately 70° with the upstream end 36 of the frustoconical vane 32, so that the taper angle is approximately 20° relative to the centerline A (see FIG. 2). The frustoconical vane 32 may be shaped to extend into a transition region 40 between the substantially round inlet opening 16 and cylindrical wall segment 24 and the substantially rectangular outlet opening 18 of the duct 14. In one particular embodiment, the ratio of the length or height of the frustoconical vane 32 (measured in the direction of arrow A) to the diameter of the frustoconical vane at the upstream end 36 is approximately 2:7. The frustoconical vane 32, as well as the entire cooling fan vane assembly 10, may be made of a mild steel, such as a 12 gauge mild steel.

The vane assembly 10 may be positioned adjacent and downstream of a cooling fan 42 having an electric motor 44 that drives a turbine 46 mounted on an output shaft 48 of the motor. In an embodiment, the inlet opening 16 of the duct 14 is immediately adjacent the turbine 46 of the cooling fan 42; that is, there is no intervening structure. The turbine 46 may include an annular hub 50 to which a plurality of radially extending turbine blades 52 is attached to its radially outer surface. The turbine blades 52 may be connected at their roots to, and positioned about, the radially outer surface of the hub 50, and in an embodiment may be spaced evenly about the outer surface.

In an embodiment, the inner stiffening ring 28 of the vane assembly 10 corresponds in diameter to an outer diameter of the hub 50, as best shown in FIG. 2. That is, the diameter of the inner stiffening ring 28 may be approximately the same as the outer diameter of the hub 50 of the cooling fan 42. Also in an embodiment, the radially extending vanes 22 of the vane assembly 10 each have a length, measured in a radial direction from the centerline A of the vane assembly, that is approximately equal to the lengths of the blades 52 of the turbine 46 of the cooling fan 42. In an embodiment, the centerline A of the vane assembly 10 is the same as (i.e., coincides with) a centerline of the turbine 46 of the cooling fan 42, and in still other embodiments may be the same as the centerlines of the output shaft 48 and motor 44. Consequently, the vanes 22 are aligned with the blades 52 of the cooling fan in a longitudinal or airflow direction, so that the radially inner ends 28 of the vanes 22 are aligned with the radially inner ends, or roots, of the blades 52, and the radially outer ends 26 of the vanes are aligned with the radially outer ends, or tips, of the blades.

In an embodiment, the frustoconical vane 32 may be mounted on one or more—and in a particular embodiment, all—of the plurality of radially extending vanes 22 (see FIG. 2). In a particular embodiment, the frustoconical vane 32 may be attached at its upstream end 36 to one or more, and in one embodiment all, of the downstream edges 54 of the plurality of radially extending vanes 22. The frustoconical vane 32 may be attached to the one or more downstream edges 54 of the radially extending vanes 22 by one or more of welding, brazing, adhesives, mechanical fasteners such as rivets or nut and bolt combinations, or other well-known means. In one particular embodiment, the frustoconical vane 32 may be concentric relative to the centerline A and thus the vane assembly 10; the upstream end 36 of the frustoconical vane contacts, and may be attached to, the radially extending vanes 22 at approximately the radial midpoints of the downstream edges 54.

As shown in FIGS. 1 and 2, the duct 14 may be positioned within the vehicle 12 adjacent a dynamic braking grid 56 having a plurality of resistor elements 58 connected in series and supported within a frame 60. In an embodiment, the braking grid 56 may have two rows of resistor elements separated by an insulating bar 61. In an embodiment, the outlet opening 18 of the duct 14 may be immediately adjacent the dynamic braking grid 56; that is, there is no intervening structure between the outlet opening and the dynamic braking grid. Also in an embodiment, the rectangular shape of the outlet opening 28 corresponds, or approximately corresponds, to the shape and size of the upstream end 62 of the dynamic braking grid 56. In an embodiment, the outlet opening 18 of the duct 14 may include a transverse stiffening strut 63 that spans the outlet opening and is aligned with the insulating bar 61. The stiffening strut 63 may taper in thickness in an upstream direction to divide airflow through the duct 14 and direct it upwardly or downwardly (FIG. 2) away from the insulating bar 61.

The dynamic braking grid 56 may in embodiments take the form of multiple discrete braking grids, each having a frame 60 supporting a plurality of resistor elements 58 connected in series along centerline A. The multiple frames 60 may be stacked spaced from each other (in one embodiment about 6 inches) and in parallel along centerline A so that their respective resistor elements, which may be plate shaped, may be substantially parallel to each other. The multiple frames 60 may be electrically connected to each other in series, in parallel, or different circuitry, and in some embodiments electrically connected to power the fan motor 44. In such a multiple-grid embodiment, the outlet opening 18 of the duct 14 may be adjacent the upstream end 62 of the closest one of the braking grids 56.

The cooling fan vane assembly 10 may be positioned within a vehicle 12 such that the cooling fan 42 is adjacent the inlet opening 16 of the duct 14 so that the rotation of the hub 50 and blades 52 of the turbine 46 direct cooling air downstream from the cooling fan along centerline A into the inlet opening of the duct. In an embodiment, the radially extending vanes 22 and the frustoconical vane 32 may be shaped to direct ambient air from the cooling fan 42 uniformly across the resistor element of the braking grid 56.

The foregoing cooling fan vane assembly 10 may be used to cool the dynamic braking grid 56. The method may include providing a cooling fan 42 having a hub 50 supporting a plurality of fan blades 52. The duct 14 may be positioned adjacent the cooling fan 42. The duct 14 may have a substantially round inlet opening 16 corresponding in diameter to an outer diameter of the plurality of fan blades 52, a substantially rectangular outer opening 18 adjacent the dynamic braking grid 56, and a side wall 20 extending between the inlet opening 16 and the outlet opening 18, and shaped to transition from a substantially round shape to a substantially rectangular shape corresponding in dimension (i.e., length, width, and geometric shape) to a shape of the dynamic braking grid to guide cooling air blown by the fan 42 to the dynamic braking grid.

The inlet opening 16 may be provided with a plurality of radially extending vanes 22 shaped and angled to direct cooling air from the fan 42 in a substantially axial direction (that is, in a direction parallel to and along the centerline A) relative to the fan hub 50. A frustoconical vane 32 may be positioned in the transition region 40 of the duct 14 adjacent the downstream side of the radially extending vanes 22. The frustoconical vane 32 may be shaped to distribute cooling air evenly across the dynamic braking grid 56.

Figure 4:
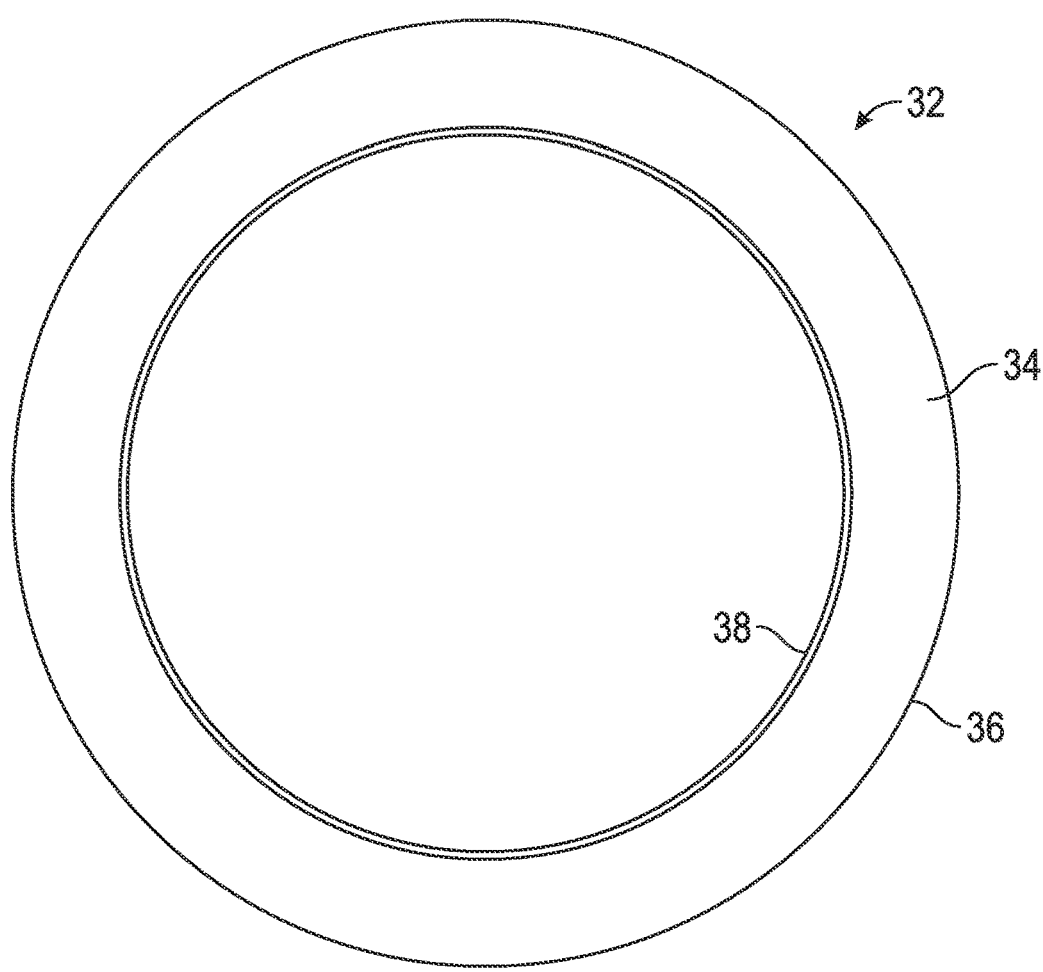
FIG. 4 is a plan view of the frustoconical vane shown in FIG. 3.

Without being limited to any specific theory of operation, from an inspection of FIG. 2 the frustoconical vane 32 is shaped and positioned to direct cooling air from the fan 42 toward the center of the dynamic braking grid 56. The blades 52 of the turbine 46 push cooling air across fixed vanes 22, but not across the center portion of the opening 16 radially inward of the stiffening ring 28, so the turbine does not blow cooling air directly toward the center of the braking grid 56. The tapered wall 34 (FIGS. 3 and 4) of the frustoconical vane 32 diverts a portion of the cooling air from the outer periphery of the inlet opening 16 flowing through the vanes 22 toward the center of the duct 14 and across the center of the dynamic braking grid 56, where the diverted portion of the cooling air flows across the portion of the resistor elements 58 located at the center of the dynamic braking grid.

The combination of the frustoconical vane 32 and the angled, radially extending vanes 22 distributes the cooling air from the fan 42 evenly across the face of the braking grid 56. The uniform air movement minimizes or eliminates hot spots that might otherwise occur on the resistor elements of the braking grid 56 during a braking operation. By providing uniform airflow across the face of the braking grid 56, the maximum temperature range, and hence the maximum braking effect, of the braking grid 56 may be increased. Further, by mounting the frustoconical vane 32 on the vanes 22, there is no support structure extending directly from the frustoconical vane to the wall 20 of the duct 14, and none is required.

While the forms of apparatus and methods disclosed may constitute preferred embodiments of the cooling fan vane assembly for resistor grid, it is to be understood that the invention is not limited to these precise forms of apparatus and methods, and that changes may be made therein without departing from the scope of the invention.

What is claimed is:

1. A cooling fan vane assembly for a resistor grid, the vane assembly comprising:
   a duct having a substantially round inlet opening, a substantially rectangular outlet opening, and a side wall extending between the inlet opening and the outlet opening shaped to transition from a substantially round shape to a substantially rectangular shape, the inlet opening having a cylindrical wall segment;
   the cylindrical wall segment including a plurality of radially extending turning vanes; and
   a frustoconical vane positioned in the duct adjacent and downstream of the plurality of radially extending turning vanes.

2. The vane assembly of claim 1, wherein the frustoconical vane includes an annular side wall that tapers in diameter from an upstream end of the frustoconical vane to a downstream end of the frustoconical vane.

3. The vane assembly of claim 2, wherein the frustoconical vane is shaped to extend into a transition region between the cylindrical wall segment and the substantially rectangular outlet opening.

4. The vane assembly of claim 1, wherein the radially outer ends of the plurality of radially extending turning vanes are attached to the cylindrical wall segment.

5. The vane assembly of claim 4, further comprising an inner stiffening ring attached to the radially inner ends of the plurality of radially extending turning vanes, such that the plurality of radially extending turning vanes extend radially outwardly from the inner stiffening ring to the cylindrical wall segment.

6. The vane assembly of claim 5, wherein the inner stiffening ring corresponds in diameter to an outer diameter of a hub of an associated cooling fan.

7. The vane assembly of claim 6, wherein the radially extending turning vanes have a length that is approximately equal to the length of blades of the associated cooling fan.

8. A method of cooling a dynamic braking grid, the method comprising:
   providing a fan having a hub supporting a plurality of fan blades;
   positioning a duct adjacent the fan, the duct having a substantially round inlet opening corresponding in diameter to an outer diameter of the plurality of fan blades and a cylindrical wall segment, a substantially rectangular outlet opening adjacent the dynamic braking grid, and a side wall extending between the inlet opening and the outlet opening shaped to transition from a substantially round shape to a substantially rectangular shape corresponding to a shape of the dynamic braking grid to guide cooling air blown by the fan to the dynamic braking grid;
   attaching a plurality of radially extending turning vanes at outer ends thereof to the cylindrical wall segment and attaching inner ends of the plurality of radially extending turning vanes to an inner stiffening ring such that the plurality of radially extending turning vanes extend from the inner stiffening ring radially outwardly to the cylindrical wall segment;

shaping and angling the plurality of radially extending turning vanes to direct the cooling air in a substantially axial direction relative to the fan hub; and providing a frustoconical vane positioned in the duct adjacent and downstream of the plurality of radially extending turning vanes, and shaping the frustoconical vane to distribute cooling air evenly across the dynamic braking grid.

9. A cooling fan vane assembly for a resistor grid, the vane assembly comprising:

a duct having a substantially round inlet opening, a substantially rectangular outlet opening, and a side wall extending between the inlet opening and the outlet opening shaped to transition from a substantially round shape to a substantially rectangular shape;

the inlet opening including a plurality of radially extending turning vanes;

a frustoconical vane positioned in the duct adjacent a downstream side of the plurality of radially extending turning vanes;

wherein the frustoconical vane includes a substantially annular side wall that tapers in diameter from an upstream end of the frustoconical vane to a downstream end of the frustoconical vane; and wherein the frustoconical vane is shaped to extend into a transition region between the substantially round inlet opening and the substantially rectangular outlet opening.

10. The vane assembly of claim 9, wherein the frustoconical vane has a taper angle of approximately 20° relative to a centerline of the duct.

11. The vane assembly of claim 10, wherein the frustoconical vane has a length-to-diameter ratio at the upstream end of approximately 2:7.

12. A cooling fan vane assembly for a resistor grid, the vane assembly comprising:

a duct having a substantially round inlet opening, a substantially rectangular outlet opening, and a side wall extending between the inlet opening and the outlet opening shaped to transition from a substantially round shape to a substantially rectangular shape;

the inlet opening including a plurality of radially extending turning vanes;

a frustoconical vane positioned in the duct adjacent a downstream side of the plurality of radially extending turning vanes;

wherein the inlet opening includes a substantially cylindrical wall segment and radially outer ends of the plurality of radially extending turning vanes are attached to the cylindrical wall segment, the inlet opening including an inner stiffening ring attached to the radially inner ends of the plurality of radially extending turning vanes, the inner stiffening ring corresponding in diameter to an outer diameter of a hub of an associated cooling fan;

wherein the radially extending turning vanes have a length that is approximately equal to the length of blades of the associated cooling fan, are plate shaped, and are angled relative to a plane containing a centerline of the duct; and wherein the frustoconical vane is mounted on one or more of the plurality of radially extending turning vanes.

13. The vane assembly of claim 12, wherein the frustoconical vane is attached at the upstream end thereof to downstream edges of one or more of the plurality of radially extending turning vanes.

14. The vane assembly of claim 13, wherein the upstream end of the frustoconical vane is positioned at approximately midpoints of the plurality of radially extending turning vanes, measured in a radial direction.

15. A cooling fan vane assembly for a resistor grid, the vane assembly comprising:

a duct having a substantially round inlet opening including a substantially cylindrical wall segment, a substantially rectangular outlet opening, and a side wall extending between the inlet opening and the outlet opening shaped to transition from a substantially round shape to a substantially rectangular shape;

the inlet opening including a plurality of radially extending turning vanes having a length approximately equal to the length of blades of the associated cooling fan, wherein radially outer ends of the plurality of radially extending turning vanes are attached to the cylindrical wall segment;

the inlet opening including an inner stiffening ring attached to radially inner ends of the plurality of radially extending turning vanes, wherein the inner stiffening ring corresponds in diameter to an outer diameter of a hub of an associated cooling fan; and a frustoconical vane positioned in the duct adjacent and downstream of the plurality of radially extending turning vanes.

16. The vane assembly of claim 15, wherein the radially extending turning vanes are plate shaped.

17. The vane assembly of claim 16, wherein the radially extending turning vanes are angled relative to a plane containing a centerline of the duct.

18. The vane assembly of claim 17, wherein the frustoconical vane is mounted on one or more of the plurality of radially extending turning vanes.

* * * * *